United States Patent
Cassell

[15] 3,650,544
[45] Mar. 21, 1972

[54] BICYCLE STABILIZER

[72] Inventor: Arnold Cassell, 47 Princeton Ave., Hewlett, N.Y. 11557

[22] Filed: June 30, 1970

[21] Appl. No.: 51,064

[52] U.S. Cl. ............................ 280/293, 35/11, 248/230, 272/28
[51] Int. Cl. ........................................... B62h 7/00
[58] Field of Search ............... 280/289, 293, 47.11; 272/28, 272/33, 35, 39, 43; 248/230; 35/11

[56] References Cited

UNITED STATES PATENTS

| | | | |
|---|---|---|---|
| 3,235,252 | 2/1966 | Grant | 272/33 R |
| 2,672,351 | 3/1954 | Kane | 280/289 |
| 3,284,096 | 11/1966 | Hansen et al. | 280/289 |
| 3,485,507 | 12/1969 | Christof | 280/47.11 |
| 2,630,334 | 3/1953 | Ewers | 280/289 |
| 903,731 | 11/1908 | Kull | 272/33 R |

Primary Examiner—Benjamin Hersh
Assistant Examiner—John P. Silverstrim
Attorney—Natter, Wigman & Natter

[57] ABSTRACT

The disclosure relates to a stabilizer attachment for a bicycle, and includes a clevis or furcated member positionable over a bicycle wheel and affixed to the wheel axle. A stabilizer mast projects upwardly from the clevis member and a ring-like loop member is adapted to be used in conjunction with the stabilizer mast. The loop member is preferably hand-held in a circumscribing position with relation to the mast so that the periphery of the loop member is spaced from the mast and a person holding the loop member and moving alongside the bicycle can use the periphery of the loop member to engage the stabilizer mast when it is desired to prevent the bicycle, while in motion, from tipping over and to thereby restore the cyclist's balance. In an alternate embodiment the stabilizer mast is provided at one end with a rotatably mounted loop member. A suspended cable is passed through the loop member so that the periphery of the loop member will engage the cable when the bicycle tends to tip over and will thus stabilize the bicycle as it moves along a path parallel to the cable.

7 Claims, 8 Drawing Figures

Patented March 21, 1972
3,650,544
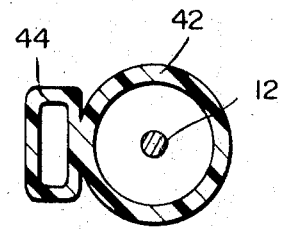
FIG. 2
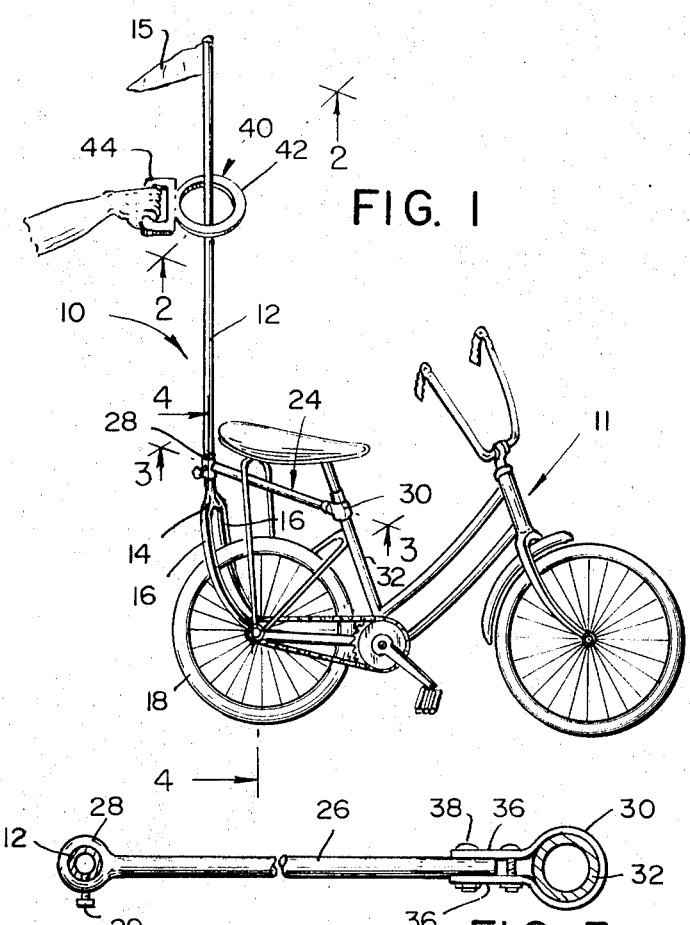
FIG. 1
FIG. 3
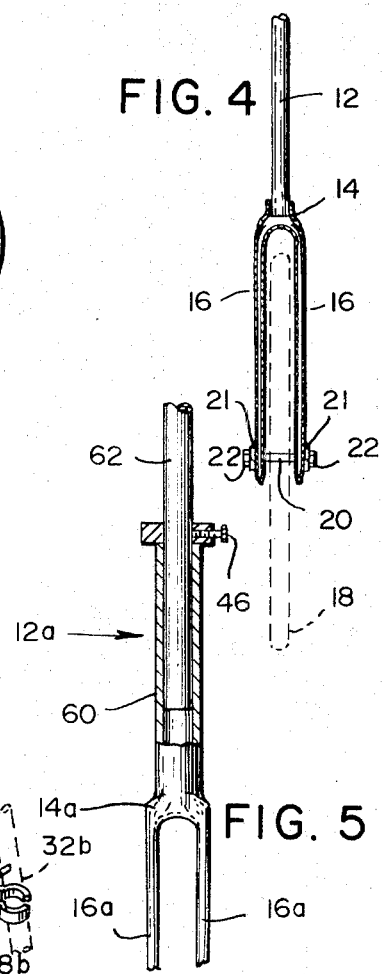
FIG. 4
FIG. 5
FIG. 6
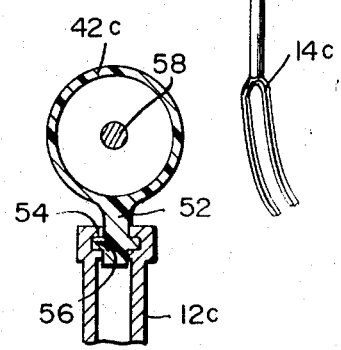
FIG. 7
FIG. 8
INVENTOR
ARNOLD CASSELL
BY
Natter, Wigman & Natter
ATTORNEYS

BICYCLE STABILIZER

This invention relates to training devices, especially to devices for facilitating the teaching of bicycle riding. More particularly, the bicycle stabilizer of this invention is directed to an instructional aid for improving a novice cyclist's skill and proficiency as well as for increasing the cyclist's confidence under actual riding conditions.

Bicycle riding is an enjoyable activity for both young and old and not only serves as an economical means for transportation, but also has salubrious effects such as helping one to maintain physical fitness. With the ever-increasing popularity in bicycle riding, it has become apparent that there is a need for an instructional device which will afford one the opportunity to safely and quickly master bicycle riding skills.

The bicycle stabilizer of this invention was developed to fulfill such a need and accordingly provides a stabilizer attachment secured to the bicycle which includes an upstanding stabilizer mast. An external force, when applied to the stabilizer mast, will be transferred to the bicycle. When the bicycle is in equilibrium no force need be exerted on the stabilizer mast. However, when the bicycle tends to tip over, an external counterbalancing force is exerted on the stabilizer mast to restore equilibrium.

Prior art devices have been developed for pushing, propelling, guiding and steering cycles, such as tricycles or similar vehicles and usually involve the use of a handle or other similar member affixed to the cycle frame or handle bars. These aforementioned devices however are not specifically designed or intended to stabilize the cycle and in fact are inapplicable for stabilizing a two-wheeled cycle such as a bicycle.

Attachments such as outrigger wheels are however conventionally employed for stabilizing bicycles and principally include two small wheels affixed to an independent frame which is secured laterally on either side of the rear wheel. The outrigger wheel attachment has a distinct disadvantage, namely the cyclist does not enjoy unrestricted freedom of movement particularly in a lateral direction, i.e. perpendicular to a vertical plane passing through the longitudinal axis of the bicycle. The outrigger wheel attachment will in fact serve as a palliative and thus alleviate the necessity for quickly mastering the skills and developing proficiency in balancing the bicycle. Consequently, the novice cyclist will not readily acquire the sense of balance of an accomplished cyclist. In contrast, the bicycle stabilizer of this invention permits almost unrestricted freedom of movement in all directions and will thus simulate actual bicycle riding conditions, yet will provide for the complete safety of the novice cyclist.

An important feature therefore of this invention resides in the fact that under normal bicycling conditions control of the bicycle is maintained almost entirely by the cyclist. This is achieved by affixing a stabilizer mast to the bicycle, preferably by means of a clevis member. The clevis member is positioned over the rear wheel of the bicycle and the legs are adapted to straddle the wheel and be secured to opposite ends of the wheel axle by appropriate fastening means.

A mounting bracket is appropriately employed to brace the stabilizer mast to the bicycle frame and thereby prevent forward or rearward movement, i.e. movement independent of the bicycle within a vertical plane passing through the longitudinal axis of the bicycle. A modification of this mounting bracket has a bifurcated member with a plurality of apertures for respectively accommodating two shafts extending from the clevis member. The apertures may selectively engage the shafts and thereby provide adjustability to the length of the mounting bracket.

The stabilizer mast is employed in conjunction with a circumscribing loop member hand held by an instructor who moves alongside and with the cyclist. The periphery of the loop member is used to contact and exert a counterbalancing force on the stabilizer mast.

The stabilizer mast in a modified embodiment is formed of two nestable or telescopic sections so that the length of the mast can be adjusted to a comfortable height for the instructor. This will be particularly significant when the instructor rides on a bicycle alongside the novice cyclist while at the same time holding the loop member around the stabilizer mast. The telescopic stabilizer mast will also permit storage of the bicycle within a confined area when not in use without requiring its removal from the bicycle.

An alternate embodiment of this invention permits the student cyclist to practice cycling without the need for having an instructor present. This is accomplished by providing a loop member rotatably mounted to the end of the stabilizer mast. A fairly rigid supporting cable or wire is passed through the loop member, and both ends of the cable are then securely fastened to a fixed support or structure, such as part of the building wall. The student cyclist can then ride the bicycle along a path parallel to the cable and when reaching the end can stop the bicycle, reverse its direction 180° and ride back along the path repeating the operation as many times as desired.

It is an object therefore of this invention to provide a bicycle stabilizer of the general character described herein which is particularly suitable as an instructional aid for the teaching of bicycle riding.

Specifically it is an object of the instant invention to provide a bicycle stabilizer having an upstanding stabilizer mast affixed to the bicycle and a cooperating loop member for circumscribing said mast and for guidingly engaging the mast to prevent the bicycle from tipping over.

Another object of this invention is to provide a bicycle stabilizer wherein the stabilizer mast is comprised of a plurality of telescopic sections, thereby permitting adjustability of the length.

A further object of the present invention is to provide a bicycle stabilizer wherein the stabilizer mast is provided with a rotatably mounted loop member having a cable passed therethrough to guidingly engage the loop member and to thereby exert a counterbalancing force on the stabilizer mast when necessary to prevent the bicycle from tipping over.

It is a still further object of this invention to provide a stabilizer device which will permit almost unrestricted freedom of movement of the bicycle in a lateral direction yet will not sacrifice or in any way endanger the safety of the cyclist.

Yet another object of this invention is to provide a bicycle stabilizer which may be readily attached to a conventional bicycle.

The above and other objects, features and advantages of the invention will be apparent from the following description of the preferred embodiments when considered in connection with the accompanying drawings.

In the accompanying drawings in wh which are shown some of the various possible embodiments of the invention:

FIG. 1 is a perspective view of the bicycle stabilizer of this invention shown attached to a bicycle and further including a loop member shown circumscribing the stabilizer bracket;

FIG. 2 is an enlarged sectional view taken along line 2—2 of FIG. 1 and shows the loop member, comprised of a circular peripheral portion and a handle portion;

FIG. 3 is an enlarged sectional view taken along line 3—3 of FIG. 1 and shows a mounting bracket for providing additional support to the stabilizer mast being attached at one end thereof to the bicycle frame;

FIG. 4 is an enlarged partial sectional view taken along line 4—4 of FIG. 1 with the rear wheel in phantom and shows the clevis member and stabilizer mast extending upwardly therefrom, the clevis member being engaged over the rear wheel and secured to the wheel axle;

FIG. 5 is a partial perspective view with a portion shown broken away of a modified embodiment of the stabilizer mast formed of a plurality of telescopic sections which are adapted to be selectively extended and rigidly held at a preferred height by means of a set screw;

FIG. 6 is an exploded partial perspective view of a modified mounting bracket arrangement having a bifurcated member which will permit adjustability by means of a plurality of register adjustment apertures adapted to fit over threaded bolts extending from opposite sides of the clevis member;

FIG. 7 is a perspective view of an alternate embodiment of the bicycle stabilizer of this invention wherein a loop member has been permanently secured to the end of the stabilizer mast and is adapted to accommodate a cable rigidly affixed at both ends to a support; and FIG. 8 is an enlarged sectional view taken along line 8—8 of FIG. 7 and shows the rotatable mounting arrangement for the loop member.

Referring now in detail to the drawings, the reference numeral 10 denotes generally the bicycle stabilizer constructed in accordance with and embodying the invention. The bicycle stabilizer 10 is shown mounted on a bicycle 11 and is comprised of an upright member or stabilizer mast 12 affixed to or formed integrally with a clevis member 14 and extending upwardly therefrom. The clevis member 14 has two depending legs 16 which fit over and straddle a rear wheel 18 of the bicycle 11. The legs 16 are further adapted to engage a wheel axle 20 and to be secured thereto by appropriate fastening means such as a lock washer 21 and a nut 22. This will firmly support the stabilizer mast 12 and prevent lateral movement independent of the bicycle, i.e. movement perpendicular to a vertical plane passing through the longitudinal axis of the bicycle 11.

A mounting bracket 24 may be optionally used to further brace the stabilizer mast 12 to prevent forward or rearward movement independent of the bicycle, i.e. movement within a vertical plane passing through a longitudinal axis of the bicycle. The mounting bracket 24 is comprised of a brace 26 having a collar portion 28 at one end thereof. The collar portion 28 is adapted to surround the stabilizing mast 12 and has a set screw 29 to positionally fix same. The other end of the brace 26 contains a split clamp 30 which secures the brace 26 to a frame portion 32 of bicycle 11. The brace 26 is disposed between two ends 36 of the split clamp 30 and a bolt or screw 38 is extended therethrough to secure the brace 26.

The stabilizer mast 12 is preferably constructed of a lightweight durable material, such as plastic which may be reinforced, for example, with fiber glass; other stock material, e.g. wood, steel, etc., may also be used. The clevis member 14 may be integrally formed with the stabilizer mast 12 and fabricated of a similar material or alternatively the clevis may be separately fabricated and the stabilizer mast 12 subsequently affixed thereto. The stabilizer mast 12 has a diameter of approximately one-half to 1 ½ inches and a length of approximately 3 to 6 feet so as to extend above the seat and hand bars of the bicycle.

It should be pointed out that the mast 12 serves as a lever with the point of contact between the rear wheel and ground surface being the fulcrum about which the bicycle will be pivoted. Consequently, it is advantageous to have the mast 12 as long as possible and placed separately from and extending above the seat so that a minimal amount of force will have to be exerted on the mast 12 in order to stabilize the bicycle.

The mounting bracket 24 may be fabricated of a similar suitable material and may be optionally employed for bracing the stabilizer mast 12. A flag or pennant 15 may be attached to the top of stabilizer mast 12 for decorative purposes.

A ring or loop member 40 is employed in conjunction with the stabilizer mast 12 and has a circular peripheral portion 42 and a handle portion 44. The loop member 40 is preferably fabricated from a rigid durable relatively lightweight material such as plastic, which may be reinforced for example with fiber glass or other stock material, e.g. steel, aluminum, wood, etc. The loop member 40 has a diameter of approximately 8 to 10 inches across the circular portion 42 and the handle portion 44 is of sufficient width so that it may be comfortably held by hand.

It should be obvious from the foregoing description that the bicycle stabilizer 10 of this invention can readily be attached to a bicycle 11 as shown in FIG. 1 without in any way interfering with the normal operation of the bicycle 11. The bicycle stabilizer 10 will in essence form a rigid extension from the bicycle 11 and may be used in a variety of ways, such as for speed control, whereby the mast 12 may be grasped to retard the bicycle. The stabilizer device is however intended primarily to provide an instructor with a means for preventing the bicycle from tipping over. In actual use the instructor will grasp the handle portion 44 of loop member 40 and place the circular portion 42 thereof over the stabilizer mast 12. The instructor may then walk, jog or run alongside the bicycle 11 as the student cyclist pedals to propel the bicycle. Alternatively, the instructor may ride along on another bicycle while at the same time firmly holding the loop member 40 in position as shown in FIG. 1. The student cyclist should if possible retain the bicycle in equilibrium without the assistance of the instructor. However, if and when the bicycle tends to tip over, the circular peripheral portion 42 of the loop member 40 is used to engage the stabilizer mast 12 so that the instructor can exert a counterbalancing force on the bicycle 11 by means of stabilizer mast 12 to restore the student cyclist's balance. The instructor can, if he so desires, grasp the mast 12 directly by hand without the use of the loop member 40.

In a modified form shown in FIG. 5, a stabilizer mast 12a is comprised of two interfitting or nestable telescopic sections 60 and 62 which are employed to provide an adjustable length to control and height and also to facilitate storage of the bicycle with the bicycle stabilizer 12a attached thereto. The stabilizer mast 12a as shown in FIG. 5 is comprised of two sections 60 and 62; however any number of sections may be employed and joined together. The clevis member 14a contains two leg portions 16a adapted to fit around the rear wheel of the bicycle and be attached to the rear axle in a manner similar to that described with reference to the stabilizer shown in FIG. 1. The lower section 60 of stabilizer mast 12a is affixed to formed integrally with clevis member 14a and is hollow, having an inside diameter slightly larger than the outside diameter of an upper section 62. The upper section 62 is adapted to be slidingly accommodated within the hollow member 60. A set screw 46 threaded within the hollow member 60 is adapted to engage the upper section 62 and thereby adjustably fix the relative position of the upper section 62 within the lower section 60. The operation and employment of the adjustable stabilizer mast 12a will in all other respects be similar to that described with reference to the stabilizer mast shown in FIG. 1.

The FIG. 6 shows a modified mounting bracket 24b comprising a bifurcated brace 26b adapted to be placed around and secured to a frame portion 32b of the bicycle by means of bolt fastener 38b. The opposite ends of the bifurcated brace 26b contains a plurality of registered apertures 35 for accommodatingly receiving the ends of threaded bolts 48 affixed to and extending from opposite sides of clevis member 14b. The bifurcated brace 26b is secured to the clevis member 14b by means of nuts 50 threaded on bolts 48. The length of brace 26b can be adjustably predetermined by appropriate selection of apertures 35 to engage bolts 48.

An alternate embodiment of the bicycle stabilizer is illustrated in FIGS. 7 and 8. In this embodiment a stabilizer mast 12c is employed, and has a clevis member 14c adapted to be attached to a bicycle in a manner similar to that described with reference to the stabilizer shown in FIG. 1. This embodiment however, rather than employing a hand held loop member incorporates a ring-like loop member 40c rotatably mounted on the stabilizer mast 12c. A circular peripheral portion 42c of loop member 40c contains a neck portion or extension 52 depending into the stabilizer mast 12c. A flange 54 formed around the extension 52 is adapted to be accommodatingly received within an annular recess or groove 56 formed in the stabilizer mast 12c. This rotatable mounting will thus effectively permit full 360° rotation of the loop member 40c about a longitudinal axis passing through the stabilizer mast 12c. The annular groove 56 and flange portion 54 may be coated with a suitable lubricating substance to reduce friction.

The modified embodiment of the bicycle stabilizer 12c is intended for employment without the necessity of an instructor being present. This modification therefore utilizes a cable, rope or wire 58 which is threaded or passed through the loop member 40c and secured at both its ends to a supporting surface such as the wall of a building. The student cyclist can ride the bicycle along a path directly below and parallel to the cable 58. If the cyclist loses equilibrium and the bicycle tends to tip over, the cable 58 will guidingly engage the circular peripheral portion 42 of the loop member 40c and will thus help to restore equilibrium to the bicycle. The cyclist, upon reaching one end of the cable 58 will have to stop and disembark from the bicycle and change the direction of travel by 180°. This will of course be possible without disengaging the cable 58 from the loop member 40c because the loop member 40c has been mounted to permit such rotation.

Although the stabilizer device has been described in connection with use on a bicycle, its application is not so limited, and in fact may be equally as applicable for use with all other types of cycles.

Furthermore, the above cited embodiments are intended as exemplary, and while they have described the invention with specific implementation thereof, other modifications and various changes might be made in the embodiments as so set forth and will be apparent to those skilled in the art.

It should therefore be understood that all material described or shown in the accompanying drawings is to be interpreted as illustrative and not in a limiting sense.

Having thus described the invention, there is claimed as new and desired to be secured by Letters Patent:

1. A training device for teaching and improving bicycle riding skills, said device being attachable to a bicycle having a frame portion including front and rear fork members for respectively receiving a front and a rear wheel, and also including a seat for supporting a cyclist, said training device comprising a stabilizer mast, said mast having an unsecured upper end and means for detachably securing a lower end of said mast to the bicycle, said securing means including a member adapted for attachment to the rear wheel of said bicycle for supporting said mast in a substantially vertical position spaced rearwardly from and extending above said bicycle seat, and balancing means cooperating with said mast for applying a manual force to the bicycle when necessary to restore equilibrium to the bicycle and cyclist.

2. A bicycle training device as claimed in claim 1, wherein said securing means includes a clevis member having bifurcated legs with each of said legs extending over an opposite face of said rear wheel.

3. A bicycle training device as claimed in claim 2, wherein the balancing means comprises a loop member adapted for accommodation over the unsecured upper end of the mast for selective engagement with the mast to manually apply a force thereto when necessary.

4. A training device as claimed in claim 3, further including a mounting bracket for supporting said mast, said bracket comprising a brace member attachable at one end to the bicycle frame below the seat and having a bifurcated portion including a plurality of spaced apertures extendible toward the clevis member, said clevis member being provided with oppositely directed arms for respective accommodation within said apertures to thereby secure the mast and to provide adjustability to the length of the brace member.

5. A training device as claimed in claim 3, further including a mounting bracket for supporting said mast, said bracket comprising a brace member attachable at one end to the bicycle frame below the seat, the other end of said brace member being provided with collar means for securing the mast.

6. A training device as claimed in claim 3, wherein the mast is comprised of an upper section and a lower section, said lower section being affixed to the clevis member and being adapted to telescopically receive said upper section therein, and clamping means for adjusting the extensible length of the upper section from the lower section.

7. A training device attachable to a conventional bicycle for teaching bicycling skills, said training device comprising a substantially vertical mast affixed to the bicycle and having an unsecured upper portion extending upwardly above said bicycle, means for securing a lower portion of the mast to the bicycle to prevent independent movement thereof with respect to the bicycle, and balancing means adapted to circumscribe the upper portion of the mast to permit the selective application of a manual force on the mast for restoring proper balance to the bicycle and cyclist thereon without restricting the forward movement of the bicycle.

* * * * *